United States Patent [15] 3,640,054
Katz [45] Feb. 8, 1972

[54] CLEANING POLLUTANTS FROM FURNACE AND INCINERATOR SMOKE AND THE LIKE

[72] Inventor: Norman Katz, 2150 W. Smithwick Lane, Hoffman Estates, Ill. 60172

[22] Filed: Apr. 17, 1970

[21] Appl. No.: 29,553

[52] U.S. Cl. ................................. 55/228, 55/421, 261/118
[51] Int. Cl. ........................................................ B01d 47/06
[58] Field of Search .................... 55/220, 227, 228, 260, 84, 55/85, 89, 93, 94, 421; 261/115–118, 17

[56] References Cited

UNITED STATES PATENTS

| | | | |
|---|---|---|---|
| 917,561 | 4/1909 | Double | 261/118 |
| 1,050,866 | 1/1913 | Snow | 261/115 |
| 1,985,010 | 12/1934 | Berkhul | 261/115 |
| 2,092,305 | 9/1937 | Estes et al. | 261/116 |
| 2,242,294 | 5/1941 | Fox et al. | 55/89 |
| 2,668,754 | 2/1954 | Lichtenfels | 55/85 |
| 3,406,499 | 10/1968 | Wiemer | 261/117 |
| 3,465,509 | 9/1969 | Gropezaet et al. | 55/228 |
| 3,518,816 | 7/1970 | Jalma | 55/240 |
| 1,655,171 | 1/1928 | Wagner | 261/116 |

Primary Examiner—Frank W. Lutter
Assistant Examiner—Bernard Nozick
Attorney—Hill, Sherman, Meroni, Gross & Simpson

[57] ABSTRACT

A means for cleaning pollutants from moving gases, such as furnace and incinerator smoke, comprising conducting the gas through a cleaning zone passage of substantial length defined by an encompassing wall from which washing liquid is sprayed to form a dense shower of the washing liquid so that the gas is continuously washed as it progresses through the shower.

12 Claims, 5 Drawing Figures

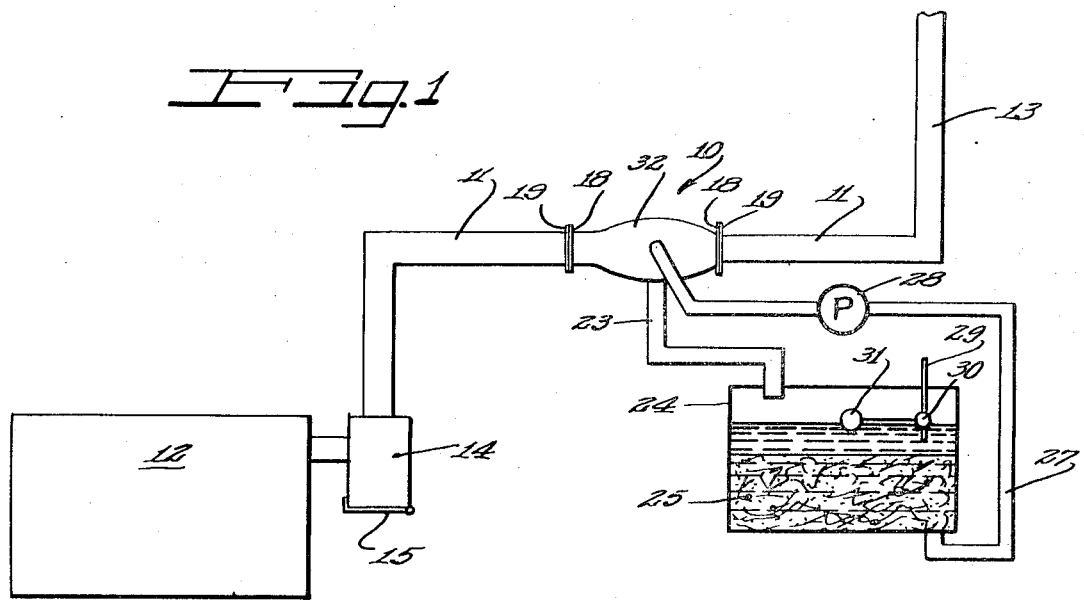
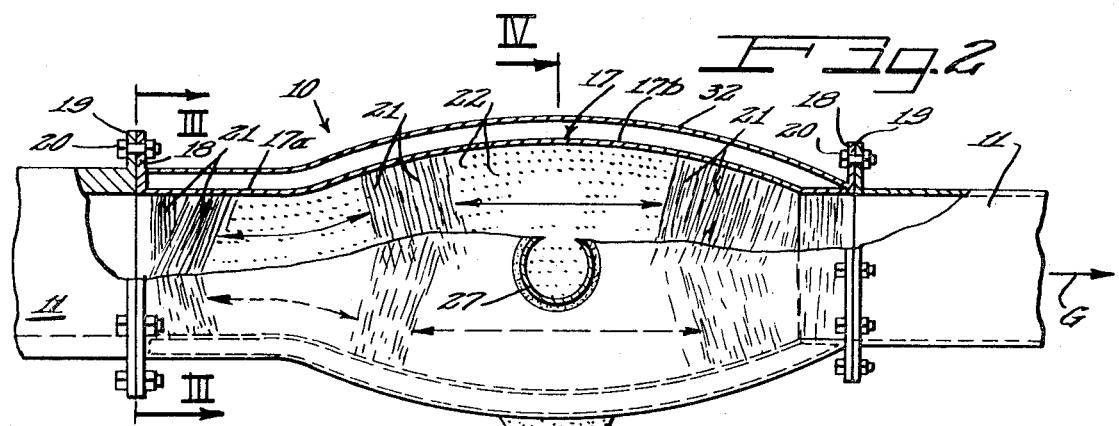
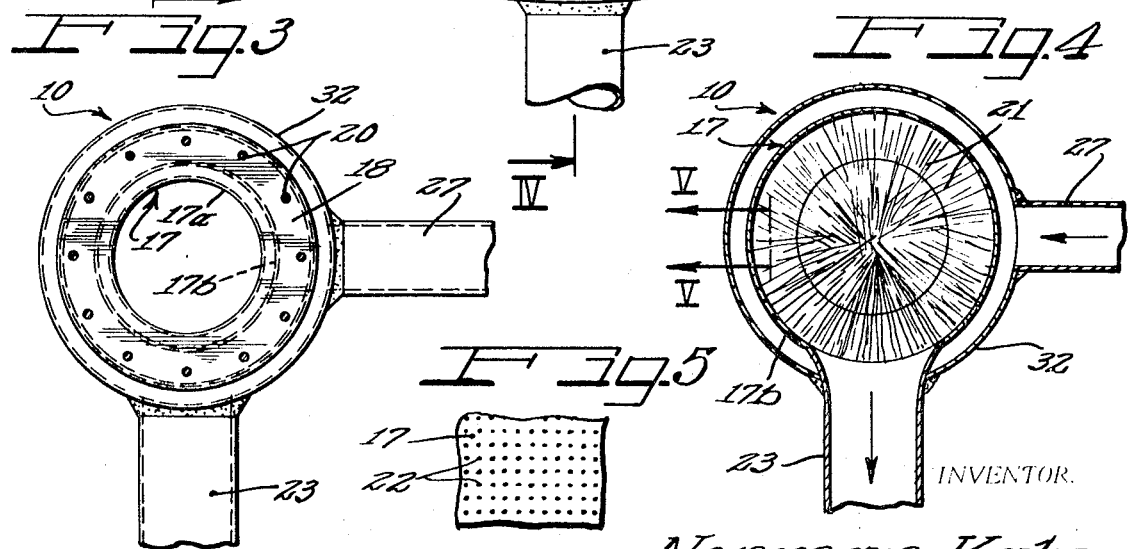
INVENTOR.
Norman Katz

CLEANING POLLUTANTS FROM FURNACE AND INCINERATOR SMOKE AND THE LIKE

This invention relates to the removal of pollutants from gas streams, and is more particularly concerned with means especially adapted for cleaning air pollutants from furnace and incinerator smoke.

Numerous and varied schemes have been suggested for smoke abatement with varying degrees of success. In general, prior arrangements have tended toward complexity involving baffles, bubbling the polluted gases through liquid bath, water curtains, and the like. Various types of precipitators are also known. Such disadvantages as complexity of most prior arrangements or systems, high installation and operating cost and other inherent disadvantages and deficiencies have mitigated against their adoption even though proliferation of smoke-emitting units has continued with industrial and population expansion.

According to the present invention, the foregoing and other disadvantages, inefficiencies, shortcomings and problems are overcome by providing a new and improved means for cleaning pollutants from flowing gas streams, and more particularly removing air pollutants from furnace and incinerator smoke.

An important object of the invention is to provide a new and improved means for cleaning gases and more particularly smoke.

Another object of the invention is to provide a new and improved means for efficiently washing pollutants from flowing gas streams such as smoke.

A further object of the invention is to provide an improved gas washing system adapted for recirculation of the washing fluid.

Still another object of the invention is to provide a new and improved simple, economical, efficient and readily adaptable means for cleansing gases and more particularly adapted for cleaning smoke to avoid environmental pollution.

Other objects, features and advantages of the invention will be readily apparent from the following description of certain preferred embodiments thereof, taken in conjunction with the accompanying drawing, although variations and modifications may be effected without departing from the spirit and scope of the novel concepts embodied in the disclosure, and in which:

FIG. 1 is a schematic illustration of a system embodying features of the invention;

FIG. 2 is an enlarged sectional elevational view showing the washing unit of the apparatus;

FIG. 3 is an end elevational view taken substantially in the plane of line III—III of FIG. 2;

FIG. 4 is a sectional detail view taken substantially along the line IV—IV of FIG. 2; and FIG. 5 is a fragmentary elevational detail view taken substantially in the plane of line V—V of FIG. 4.

According to the present invention, gas-carried pollutants, such as those in furnace and incinerator smoke, are cleaned therefrom by conducting the gas with pollutants as a continuously moving stream through a cleaning zone passage of substantial length defined by an encompassing wall, and driving spray streams of washing liquid from said wall in substantially its entire ambit and dispersing the spray streams to provide a gas permeable dense shower of the washing liquid completely across the passage so that the gas stream is thoroughly washed as it progresses through the shower. The cleaning zone is desirably provided by a device having a perforated tunnel wall surrounded by a water jacket and adapted to be inserted at a suitable convenient point in a flue.

In a typical example of means providing a cleaning zone passage, a washing device 10, is constructed and arranged to be mounted in or as part of a flue 11 leading from a polluted gas producer such as an incinerator or furnace 12 and exhausting to a receiving space such as atmosphere, for example, through a chimney 13. In order to collect heavier particulate matter from the flue stream, an expansion and collecting chamber 14 is desirably located to receive the pollutant-laden gases immediately upon entering the flue or soon after entering the flue. For periodically removing accumulated solids dropping from the gas and accumulating in the chamber 14, a cleanout door 15 is desirably provided for access into the chamber for dumping the accumulated material therefrom.

In a desirable form the washing device 10 provides a cleaning zone passage or tunnel of substantial length defined by an encompassing wall 17. At its opposite ends the wall 17 is desirably constructed to join with respective ends of the pipe providing the flue 11 between which the tunnel unit or device 10 is connected for continuous flow of the gas stream through the tunnel as it flows through the flue. Any suitable means may be provided for securing the ends of the tunnel wall to the flue pipe, such as complementary annular flanges 18 on the respective opposite ends of the tunnel wall engaging annular collar flanges 19 on the flue ends and secured thereto as by means of bolts 20. Through this arrangement, the tunnel wall 17, in effect, becomes a part of the flue.

Means are provided for washing the gas stream as it progresses through the tunnel passage by driving spray streams 21 of a washing liquid, such as water, from substantially the entire area of the tunnel wall 17. This is desirably accomplished simply by providing the wall 17 with orifice or nozzle perforations 22 of such size and shape and with their axes so directed as to emit into the tunnel passage and project the spray streams 21 in a manner to wash the gas stream quite thoroughly. As shown in FIG. 5, for example, the nozzle orifices 22 are disposed in a uniform pattern in longitudinal and circumferential rows substantially throughout the length of the wall and therefore of the tunnel passage. Any other preferred pattern of placement of the orifices 22 may be provided to afford a spray pattern which will accomplish the desired results for the particular gas to be cleaned. By having the orifices 22 distributed substantially uniformly throughout substantially the entire area of the wall 17, extremely thorough washing of the gas stream is effected as the gas stream progresses through the substantial length of the tunnel passage. As best visualized in FIGS. 2 and 4, the spray streams 21 by their relative density in numbers and projection across the passage throughout substantially the entire length of and from the entire ambit of the wall 17 provide a dense shower of the washing liquid completely across the passage. At least some of the spray streams 21 collide adjacent the longitudinal center or axis of the tunnel and a splattering occurs which breaks the streams into droplets to which fine solid particles and water soluble chemical constituents of the gas stream adhere and are thus washed from the gas stream as the water drops toward drain which may be located in the bottom of the tunnel. At least some of the spray streams 21 may at least in part due to their velocity carry over diametrically against the wall 17 from the respective orifices 22 from which projected whereby to impinge and wash the wall. Washing effect of the spray streams 21 may be enhanced by having the streams directed at diagonal angles to the axis of the tunnel, either angled in opposition to the direction of movement of the gas stream or in the same direction as the gas stream is moving, although in part the spray streams may extend generally normal to the axis of the tunnel. By their diagonal disposition, the length of travel of the spray streams is increased and instead of head-on impingement of the streams they will impinge and glancingly strike one another and improve the spray dispersion. For example, as shown in FIG. 2, wherein the direction of flow of the gas stream is indicated by the arrow G, the spray streams 21 may be directed in part normal to the axis of the tunnel and the gas flow path, and in part diagonally relative to the tunnel axis and biased in opposition to the direction of flow of the gas stream in a generally cylindrical but preferably at least slightly inwardly flaring section 17a of the tunnel wall 17 and which joins a generally elongated bulbar expansion chamber portion 17b of the wall which increases progressively in diameter to a longitudinal mid point of this section and then progressively decreases in diameter to substantially the diameter of the flue 11. Within the expansion chamber portion the spray streams 21 may have their respective axes generally normal to the portion of the wall 17 from which they emanate such that except at the longitudinal center and maximum diameter of the section 17b the spray streams 21 will be at varying degrees of diagonal angularity to the gas stream passage axis, being in part directed with a diagonal bias in the direction of movement of the gas stream and in part in opposition to the direction of movement, and at the exit from the tunnel being directly generally normal to the axis. It should be understood that although the tunnel wall 17 may be only partially generally cylindrical as shown, it may if preferred be substantially cylindrical throughout its length. It may also be angular to dip toward a drain-off sump. On the other hand, it may be constructed substantially as shown in FIG. 2 but with a generally cylindrical portion at each end and having the bulbar section intervening and connecting the generally cylindrical tubular sections. If preferred, of course, the tunnel may merely be bulbar as in the section 17b. The principal consideration is to provide the most efficient washing arrangement for any particular installation requirements. The bulbar arrangement is desirable as providing a substantial expansion chamber coupled with the dense shower of the washing liquid environment.

Draining of spent washing liquid is effected in a manner to evacuate the tunnel passage thoroughly and with minimum interference with the shower-producing spray means. By way of example, a drain 23 leads from the lowest point in the passage provided by the tunnel, in this instance the low point in the wall portion 17b, and is of a capacity which assures rapid drain-off without backup of spent washing liquid along the bottom of the tunnel, so that the orifices 22 will be effective even quite close to the drain exit. Although the drain 23 may lead to a sewer discharge, environmental control is improved by discharging the spent liquid and its load of pollutants into a collecting basin or tank 24 which, in a desirable arrangement is a filter or at least contains a filter bed 25. For washing liquid conservation, the clarified and, if necessary, chemically treated washing liquid is then recirculated through the washing device 10. This may be effected by way of a duct 27 leading from an advantageous portion of the tank 24 such as the bottom and at least from under the filter bed 25, a suitable pump 28 in the duct 27 effecting delivery of the washing liquid under the desired pressure to the washer. Inasmuch as some of the washing liquid may be evaporated and exhausted with the cleaned flue gases, makeup liquid may be supplied to the tank 24 through a pipe 29 under the control of a valve 30 which is controlled by means such as a float 31 riding the surface of the liquid body in the tank 24. Either by way of the makeup pipe 29 or separately, any desirable treating chemicals may be supplied to the washing liquid in the tank 24. For example, oxides such as may produce sulfuric or sulfureous acid in the wash water may be neutralized by the addition of suitable sweeteners or neutralizers such as lime. Any suitable means, of which numerous are known in the filtration art may be employed to clean the filter bed 25 as needed.

In order to distribute the washing liquid delivered to the washing device 10 for uniform distribution about the tunnel wall 17, a jacket in the form of a shell 32 is desirably mounted about the wall 17 in spaced relation and with the pressure supply duct 27 located to deliver the liquid into the jacket at the most advantageous place such as at a suitable location along its length. At its opposite ends, the jacket shell 32 is hermetically secured to the wall 17 as for example to the attachment flanges 18. Where the drain leaves the tunnel wall 17 and passes through the jacket shell 32, the shell is hermetically sealed about the drain.

It will be understood that variations and modifications may be effected without departing from the spirit and scope of the novel concepts of this invention.

I claim as my invention:

1. Apparatus for cleaning pollutants from moving gas and especially adapted for cleaning potential air pollutants from furnace and incinerator smoke, comprising:

means providing a cleaning zone passage having its axis generally horizontal and being of substantial length defined by an encompassing wall and through which gas with pollutants is adapted to be conducted as a continuously moving flow;

a spaced jacket about said wall providing a washing liquid supply chamber;

said wall being perforate to provide orifices located at closely spaced points in substantially the entire ambit and length of said wall to drive spray streams of washing liquid toward said axis;

said orifices being disposed to direct said streams generally diagonally downstream in an upstream portion of said passage, generally normal to said axis in an intermediate portion of said passage and generally diagonally upstream in a downstream portion of said passage whereby the spray streams impinge and glancingly strike one another and thereby disperse the spray streams into a gas-permeable dense shower of the washing liquid completely across and substantially throughout the length of the passage to assure thorough washing of the flowing gas as it progresses along the passage through the shower;

means for supplying the washing liquid to said chamber under pressure to drive the liquid through said orifices to provide said spray streams;

said wall having a low point therein generally centrally along the length of said passage toward which spent washing liquid is adapted to flow from each end of the passage; and a drain leading from said low point through said supply chamber and said jacket and sealed from said supply chamber.

2. Apparatus according to claim 1, in which said orifices in the extremity of said upstream portion of said passage are directed generally normal to said axis upstream from said orifices which direct the streams generally diagonally downstream.

3. Apparatus according to claim 1, including orifices upstream from said orifices which direct the streams generally diagonally downstream, said upstream orifices being disposed to direct the streams therefrom diagonally generally upstream.

4. Apparatus according to claim 1, including orifices in the downstream extremity area of said downstream portion of said passage disposed to direct the streams therefrom generally normal to the passage axis.

5. Apparatus according to claim 1, comprising orifices in the upstream extremity area of said upstream portion of said passage disposed to direct streams therefrom generally normal to said axis, followed by orifices located immediately downstream which are disposed to direct the streams therefrom generally diagonally upstream relative to said axis, followed by said orifices disposed to direct the streams generally diagonally downstream.

6. Apparatus according to claim 5, including orifices in the downstream extremity area of said downstream portion of said passage disposed to direct the streams therefrom generally normal to the passage axis.

7. Apparatus according to claim 1, in which said wall is of generally bulbar form with the narrowest ends adjacent to the ends of said upstream and downstream portions and with the widest dimension at said intermediate portion.

8. Apparatus according to claim 7, said wall having a cylindrical portion at the upstream end thereof.

9. Apparatus according to claim 7, said wall having a cylindrical portion at the downstream end thereof.

10. Apparatus according to claim 7, said wall having respective cylindrical terminal portions at the upstream and downstream ends thereof.

11. Apparatus for cleaning pollutants from moving gas and especially adapted for cleaning potential air pollutants from furnace and incinerator smoke, comprising:

means providing a cleaning zone passage having its axis generally horizontal and being of substantial length defined by an encompassing wall and through which gas with pollutants is adapted to be conducted as a continuously moving flow;

a spaced jacket about said wall providing a washing liquid supply chamber;

said wall being perforate to provide orifices located at closely spaced points in substantially the entire ambit and length of said wall to drive spray streams of washing liquid toward said axis;

said orifices being disposed to direct said streams generally diagonally downstream in an upstream portion of said passage, generally normal to said axis in an intermediate portion of said passage and generally diagonally upstream in a downstream portion of said passage whereby the spray streams impinge and glancingly strike one another and thereby disperse the spray streams into a gas-permeable dense shower of the washing liquid completely across and substantially throughout the length of the passage to assure thorough washing of the flowing gas as it progresses along the passage through the shower;

means for supplying the washing liquid to said chamber under pressure to drive the liquid through said orifices to provide said spray streams;

said wall having a low point therein generally centrally along the length of said passage toward which spent washing liquid is adapted to flow from each end of the passage;

a drain leading from said low point through said supply chamber and said jacket and sealed from said supply chamber;

said means for supplying the washing liquid including a duct communicating with said supply chamber through said jacket spaced from said drain.

12. Apparatus according to claim 11, including means for cleaning and recirculating the spent washing liquid from said drain through said duct.

* * * * *